(12) United States Patent
Takakusaki

(10) Patent No.: US 7,916,889 B2
(45) Date of Patent: Mar. 29, 2011

(54) ELECTRONIC APPARATUS

(75) Inventor: Masahiko Takakusaki, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 142 days.

(21) Appl. No.: 12/426,781

(22) Filed: Apr. 20, 2009

(65) Prior Publication Data

US 2009/0296977 A1 Dec. 3, 2009

(30) Foreign Application Priority Data

May 30, 2008 (JP) ................................. 2008-143022

(51) Int. Cl.
*H04R 1/02* (2006.01)
*H05K 5/00* (2006.01)

(52) U.S. Cl. .................................. 381/388; 361/679.09

(58) Field of Classification Search ............. 361/679.09, 361/679.19, 679.59; 381/388
See application file for complete search history.

(56) References Cited

U.S. PATENT DOCUMENTS

| | | | |
|---|---|---|---|
| 4,996,182 A | 2/1991 | Matsui et al. | |
| 6,415,035 B1 | 7/2002 | Shin et al. | |
| 6,519,139 B2* | 2/2003 | Kambayashi | 361/679.09 |
| 6,925,188 B1 | 8/2005 | Markow et al. | |
| 7,079,389 B2 | 7/2006 | Tago | |
| 7,272,422 B2 | 9/2007 | Nagasawa et al. | |
| 7,723,624 B2 | 5/2010 | Nakajima | |
| 2005/0063148 A1 | 3/2005 | Tago | |
| 2005/0069159 A1 | 3/2005 | Nakazato | |
| 2006/0067557 A1* | 3/2006 | Imamura | 381/388 |
| 2006/0267961 A1 | 11/2006 | Onoda | |
| 2007/0166019 A1 | 7/2007 | Kitahara | |
| 2008/0019085 A1 | 1/2008 | Nakajima | |
| 2008/0285217 A1 | 11/2008 | Nakajima | |
| 2008/0285218 A1 | 11/2008 | Iijima | |
| 2008/0304214 A1 | 12/2008 | Nakajima | |

FOREIGN PATENT DOCUMENTS

| | | |
|---|---|---|
| JP | 44-24333 | 10/1969 |
| JP | 61-95343 | 6/1986 |
| JP | 63-5531 | 1/1988 |
| JP | 02-070479 | 3/1990 |
| JP | 4-8487 | 1/1992 |
| JP | 04-030211 | 2/1992 |
| JP | 06-014435 | 1/1994 |
| JP | 7-33091 | 6/1995 |
| JP | 8-076887 | 3/1996 |
| JP | 09-244764 | 9/1997 |

(Continued)

OTHER PUBLICATIONS

Japanese Patent Application No. 2009-199497, Notice of Reasons for Rejection, mailed Jul. 6, 2010, (English Translation).

(Continued)

*Primary Examiner* — Brian Ensey
(74) *Attorney, Agent, or Firm* — Blakely, Sokoloff, Taylor & Zafman LLP

(57) ABSTRACT

According to one embodiment, an electronic apparatus includes a housing including a top wall, a keyboard supported on the top wall, and a speaker contained in the housing. A region of the top wall positioned on the front side of the keyboard comprises a palm-rest surface on which a user's hand is to be placed, and a speaker exposure surface including an opening part exposing the speaker to an outside of the housing. The speaker exposure surface is depressed and lower than the palm-rest surface.

2 Claims, 9 Drawing Sheets

FOREIGN PATENT DOCUMENTS

| | | |
|---|---|---|
| JP | 11-053053 | 2/1999 |
| JP | 2000-020194 | 1/2000 |
| JP | 2001-092581 | 4/2001 |
| JP | 2001-154782 | 6/2001 |
| JP | 2002-032178 | 1/2002 |
| JP | 2002-182784 | 6/2002 |
| JP | 2003-186581 | 4/2003 |
| JP | 2003114736 | 4/2003 |
| JP | 2003-195976 | 7/2003 |
| JP | 2004-289563 | 10/2004 |
| JP | 2005-073129 | 3/2005 |
| JP | 2005-109672 | 4/2005 |
| JP | 2005100042 | 4/2005 |
| JP | 2005-130156 | 5/2005 |
| JP | 2005-190368 | 7/2005 |
| JP | 2005-236383 | 9/2005 |
| JP | 2006-318372 | 11/2006 |
| JP | 2007-193600 | 8/2007 |
| JP | 2007-323530 | 12/2007 |
| JP | 2008-027137 | 2/2008 |
| JP | 2008-109605 | 5/2008 |
| WO | 2007086117 | 8/2007 |

OTHER PUBLICATIONS

Japanese Patent Application No. 2010-025229, Notification of Reasons for Rejection, mailed Mar. 16, 2010, (English Translation).

"Featured new products", Nikkei Personal Computer, Japan, Nikkei Business Publications, Inc., published on Oct. 22, 2007, the Oct. 22, 2007 issue, p. 29.

"Featured new products", Nikkei Personal Computer, Japan, Nikkei Business Publications, Inc., published on Feb. 25, 2008, the Feb. 25, 2008 issue, p. 31.

Toshiyasu Hirasawa, "HotHot Review!, PC Watch [online]", Mar. 12, 2008, [searched for on Aug. 20, 2010], URL, http://pc.watch.impress.co.jp/docs/2008/0312/hotrev354.htm.

Japanese Patent Application No. 2010-025229, Decision of Rejection, mailed Nov. 16, 2010, (English Translation).

* cited by examiner

# ELECTRONIC APPARATUS

CROSS-REFERENCE TO RELATED APPLICATIONS

This application is based upon and claims the benefit of priority from Japanese Patent Application No. 2008143022, filed May 30, 2008, the entire contents of which are incorporated herein by reference.

BACKGROUND

1. Field

One embodiment of the invention relates to an electronic apparatus such as a portable computer.

2. Description of the Related Art

In an electronic apparatus such as a portable computer, a speaker is incorporated.

Jpn. Pat. Appln. KOKAI Publication No. 2005-109672 discloses an electronic apparatus in which a speaker is provided on the side of the palm rest. This electronic apparatus has a speaker containing section on the side of the palm rest. A speaker unit comprising the speaker is provided in the speaker containing section, and is turnable between a contained position at which the speaker unit is laid down to be contained in the speaker containing section, and a rising position at which the speaker unit protrudes from the speaker containing section. A top surface of the speaker unit in the contained position is flush with the palm rest.

Further, an electronic apparatus such as a portable computer comprises a touchpad serving as a pointing device. The touchpad is provided in the region on the front side of the keyboard, and is adjacent to the palm rest.

Jpn. Pat. Appln. KOKAI Publication No. 2002-32178 discloses an electronic apparatus provided with a palm rest effective for sanitary retainment or reduction in fatigue of the palm of the operator. This palm rest is provided with innumerable small protrusions on a surface with which the operator's palms come into contact.

Further, an electronic apparatus such as a portable computer is provided with a plurality of USB connectors on, for example, the sidewall of the housing. The plural USB connectors are arranged at the same height position. That is, when the electronic apparatus is placed on top of a desk, the plural USB connectors are positioned at the same height from the desktop.

Further, an electronic apparatus such as a portable computer is provided with foot sections on the bottom wall of the housing.

Jpn. UM Appln. KOKAI Publication No. 2-70479 discloses an electronic apparatus provided with a plurality of support feet on the bottom surface of the apparatus body. Each of the plural support feet comprises a contact member to be in contact with the desktop. The frictional resistance of the contact member of the support foot on the rear side of the apparatus body is smaller than the frictional resistance of the contact member of the support foot on the front side of the apparatus body.

Incidentally, further improvement in the operability is required of the electronic apparatus described above.

BRIER DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus comprises a housing comprising a top wall, a keyboard supported on the top wall, and a speaker contained in the housing. The top wall comprises a region positioned on the front side of the keyboard. This region comprises a palm-rest surface on which a user's hand is to be placed, and a speaker exposure surface comprising an opening part exposing the speaker to an outside of the housing. The speaker exposure surface is depressed and lower than the palm-rest surface.

Figure 1:
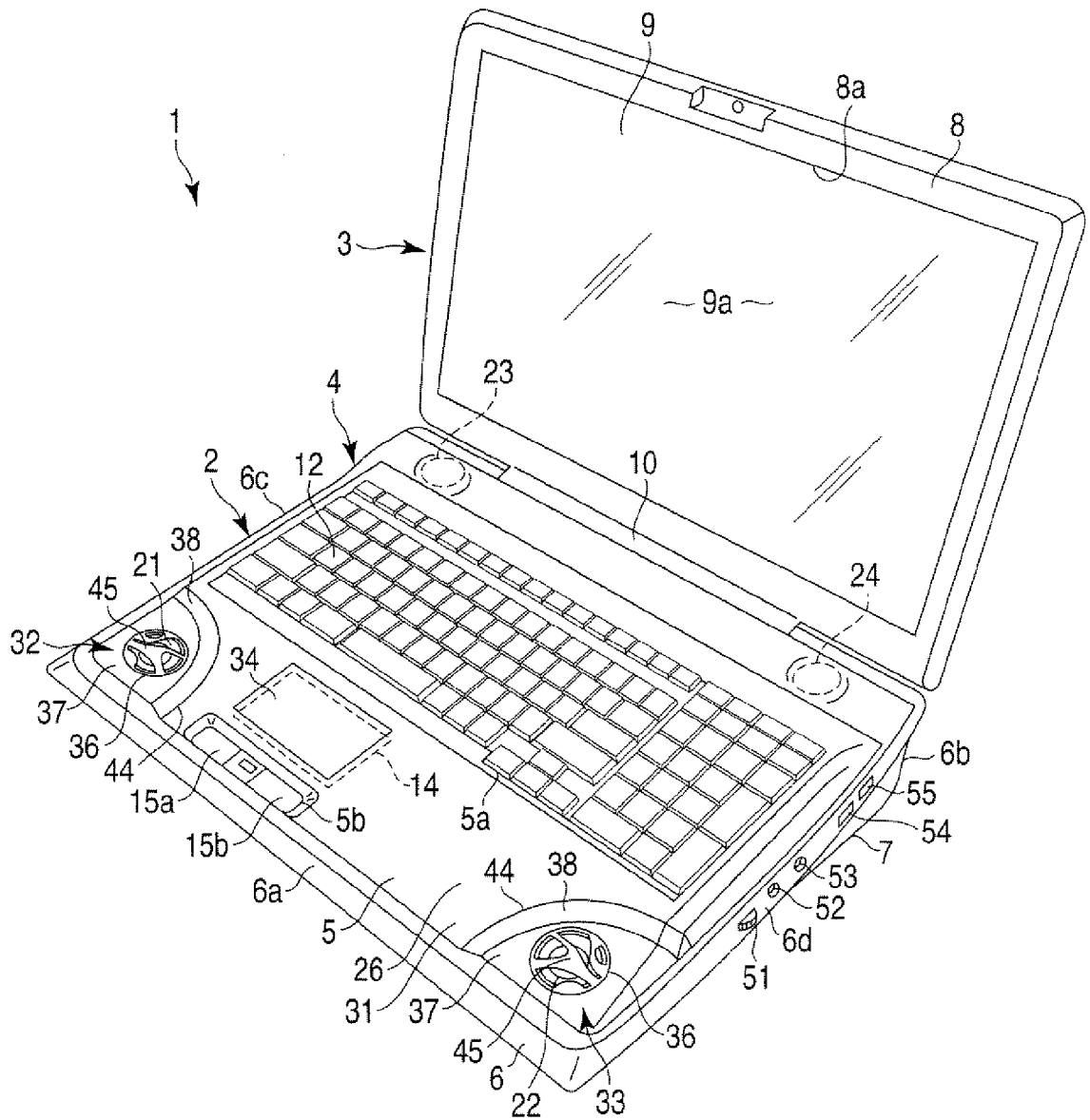
FIG. 1 is an exemplary perspective view of a portable computer according to an embodiment of the invention.

An embodiment of the present invention wilt be described below on the basis of drawings in which the embodiment is applied to a portable computer. FIGS. 1 to 9 disclose a portable computer 1 as an electronic apparatus according to an embodiment of the present invention. As shown in FIG. 1, the portable computer 1 comprises a main unit 2, and a display unit 3.

The main unit 2 comprises a housing 4 formed into a flat box-like shape. The housing 4 comprises a top wall 5, a peripheral wall 6, and a bottom wall 7. The top wall 5 extends horizontally, and is directed to the above. The peripheral wall 6 extends downwardly from the peripheral edge sections of the top wall 5. The bottom wall 7 extends substantially in parallel with the top wall 5 to connect the lower edge sections of the peripheral wall 6 to each other.

The peripheral wall 6 comprises a front wall 6a, a rear wall 6b, and a pair of right and left sidewalls 6c and 6d. The front wall 6a is configured to confront the user, and extends in the right-and-left direction (i.e., the width direction) of the housing 4. The rear wall 6b is positioned at an end section on the opposite side of the user in the housing 4, and extends in the width direction of the housing. The pair of sidewalls 6c and 6d extends in the front-and-rear direction (i.e., the depth direction) to connect end sections of the front wall 6a, and end sections of the rear wall 6b to each other.

Incidentally, in this description, the front-and-rear direction of the housing is defined in such a manner that the side closer to the user (i.e., the user side) is made the front side, and the side farther from the user is made the rear side. That is, the "front end section" implies, of both the end sections in the depth direction, the end section closer to the user. Further, the "rear end section" implies, of both the end sections in the depth direction, the end section farther from the user. Further, in this description, the right-and-left direction of the housing is defined in such a manner that the left hand viewed from the user is the left side, and the right hand viewed from the user is the right side.

As shown in FIG. 1, the display unit 3 comprises a display housing 8, and a display device 9 contained in the display housing 8. An example of the display device 9 is a liquid crystal display. The display device 9 comprises a display screen 9a. The display screen 9a is exposed to the outside through an opening part 8a provided in the front wall of the display housing 8.

A hinge section 10 is provided at the rear end section of the main unit 2. The hinge section 10 turnably connects the display unit 3 to the main unit 2. As a result of this, the display unit 3 is rotatable between a first posture in which the display unit 3 is laid down to cover the top wall 5 of the main unit 2 from above, and a second posture in which the display unit 3 is raised from the top wall 5.

As shown in FIG. 1, the top wall 5 comprises a keyboard placing section 5a. The keyboard 12 is attached to the keyboard placing section 5a, and is supported on the top wall 5. Further, on the front end section (i.e., the end section on the user side) in the housing 4, a touchpad 14 serving as a pointing device, and a pair of touchpad buttons 15a and 15b are mounted. The touchpad buttons 15a and 15b are exposed to the outside of the housing 4 through an opening part 5b provided in the top wall 5. On the other hand, the touchpad 14 is contained in the housing 4. The touchpad 14 is covered with the top wall 5, and is not exposed to the outside of the housing 4. The touchpad 14 is arranged along the inner surface (i.e., the surface of the housing 4 facing the internal space of the housing 4) of the top wall 5.

As shown in FIG. 1, for example, a plurality of speakers 21, 22, 23, and 24 are contained in the housing 4. Of the plural speakers, for example, two speakers 21 and 22 are arranged on the front end section in the housing 4. The two speakers 21 and 22 are mounted separately from each other on the left front end section in the housing 4, and on the right front end section therein. The remaining two speakers 23 and 24 are arranged in the rear end section in the housing 4.

Figure 2:
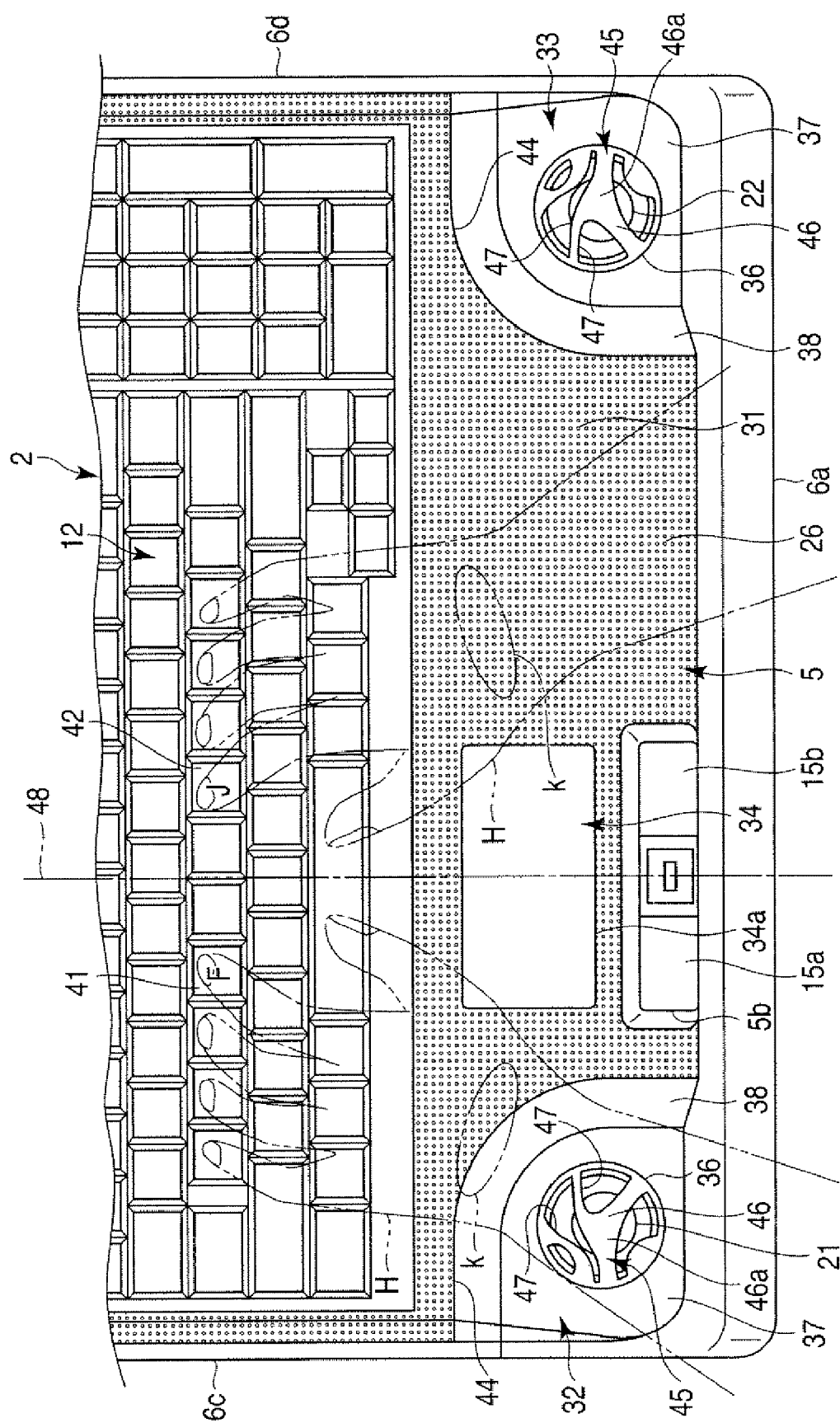
FIG. 2 is an exemplary plan view showing a palm-rest surface shown in FIG. 1.
Figure 3:
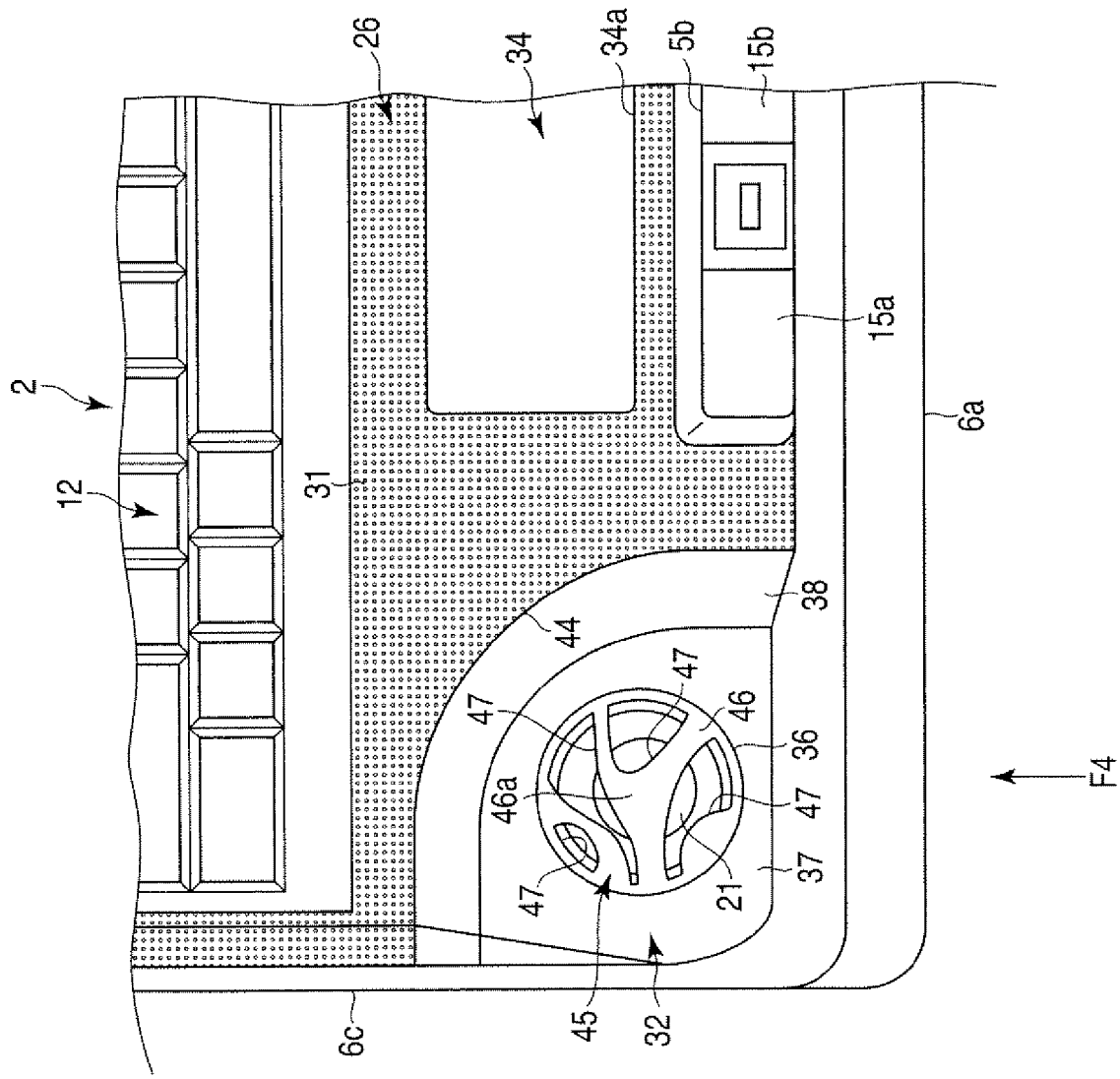
FIG. 3 is an exemplary plan view showing a speaker exposure section shown in FIG. 2 in an enlarging manner.

As shown in FIGS. 1 and 2, the top wall 5 comprises a front section region 26 positioned on the front side of the keyboard 12. The front section region 26 comprises a palm-rest surface 31, a pair of right and left speaker exposure surfaces 32 and 33, and a touchpad surface 34.

As shown in FIG. 2, the palm-rest surface 31 is a surface on which the user's right and left hands H (particularly the heel parts k of the hands H) are to be placed when the keyboard 12 is used. Incidentally, the heel part k of the hand H is the end part of the palm positioned on the wrist side. The palm-rest surface 31 extends from a left edge section to a right edge section of the front section region 26, and occupies a relatively large area of the front section region 26. In other words, a region in the front section region 26 other than the speaker exposure surfaces 32 and 33, and the touchpad surface 34 is the palm-rest surface 31.

Next, the speaker exposure surfaces 32 and 33 will be described below.

The speaker exposure surfaces 32 and 33 are provided on the front end section of the top wall 5, and are positioned above the speakers 21 and 22 mounted on the front end section inside the housing 4. The one speaker exposure surface 32 is provided on the left front end section (i.e., the left front corner section) of the top wall 5. The other speaker exposure surface 33 is provided on the right front end section (i.e., the right front corner section) of the top wall 5. In each of the speaker exposure surfaces 32 and 33, an opening part 36 exposing the speaker 21, 22 to the outside of the housing 4 is provided.

As shown in FIGS. 1 to 4, the speaker exposure surface 32, 33 is depressed by about several mm with respect to the palm-rest surface 31, and is lower than the palm-rest surface 31. More specifically, the speaker exposure surface 32, 33 comprises an in-depth surface 37 (i.e., the depressed surface) positioned lower than the palm-rest surface 31, and an inclined surface 38 smoothly connecting a peripheral edge of the in-depth surface 37 to a peripheral edge of the palm-rest surface 31. The opening part 36 exposing the speaker 21, 22 to the outside is opened at the in-depth surface 37.

As shown in FIG. 2, when the user's hands H are at the home position of the keyboard 12 (that is, when the index fingers of the hands are placed on the F key 41 and the J key 42 which are the reference keys), the palm-rest surface 31 extends up to a part configured to support the heel part k of the user's left hand H. That is, when the user's hands H are at the home position of the keyboard 12, the palm-rest surface 31 extends to a part on which the heel part k of the user's left hand H is placed.

Incidentally, in the portable computer 1 according to this embodiment, when the user's hands H are at the home position of the keyboard 12, the heel part k of the user's left hand H is placed astride both the palm-rest surface 31 and the inclined surface 38 of the speaker exposure surface 32. That is, the user can stably place his or her hands utilizing the inclination change at a border section 44 between the palm-rest surface 31 and the inclined surface 38.

As shown in FIG. 2, the border section 44 between the palm-rest surface 31 and the speaker exposure surface 32, 33 is formed into an arcuate shape made convex from the speaker exposure surface 32, 33 toward the palm-rest surface 31. This border section 44 is formed into an arcuate shape a center of which is, for example, the center part of the speaker 21, 22.

Figure 4:
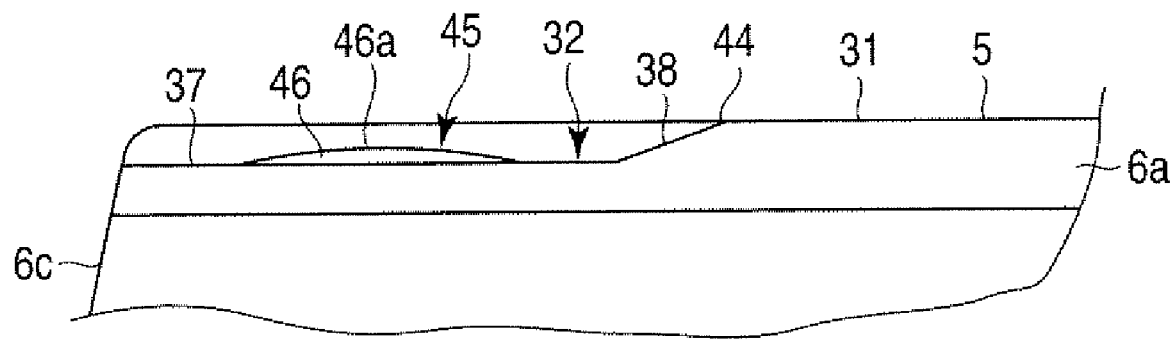
FIG. 4 is an exemplary front view of a speaker exposure surface shown in FIG. 3 viewed from the direction F4.

As shown in FIGS. 2 and 4, the portable computer 1 comprises a speaker cover 45 attached to the opening part 36 of the speaker exposure surface 32, 33, and positioned above the speaker 21, 22. The speaker cover 45 comprises a top surface section 46 formed into a dome-like shape, and upwardly swelling higher than the speaker exposure surface 32, 33, and sound ports 47 provided in the top surface section 46. The top surface section 46 swells upwardly higher than the speaker exposure surface 32, 33, by, for example, about 0.5 mm. At least a part of the sound port 47 is opened in a region deviated from a peak part 46a of the top surface section 46 such that the port 47 is configured to communicate with the outside even when the user's hand H is placed on the top surface section 46.

Next, the touchpad surface 34 will be described below.

The touchpad surface 34 is provided above the touchpad 14, and is opposed to the touchpad 14 mounted on the inside of the housing 4. The user can operate the touchpad 14 by touching the touchpad surface 34. As described above, the palm-rest surface 31 is situated off the touchpad surface 34.

As shown in FIG. 2, the touchpad surface 34 (i.e., the touchpad 14) is arranged by using the home position of the keyboard 12 as the reference. That is, the touchpad surface 34 is arranged in such a manner that a keyboard centerline 48 passing through the midpoint between the F key 41 and the J key 42 passes through the center of the touchpad surface 34.

The keyboard 12 according to this embodiment comprises braille keys, and hence the keyboard centerline 48 is shifted from the central part of the housing 4 to the left by a relatively large amount, for example. That is, the touchpad surface 34 is shifted from the central part of the housing 4 to the left by a relatively large amount, for example.

The palm-rest surface 31 according to this embodiment is rough in texture as compared with the touchpad surface 34. The palm-rest surface 31 is provided with, for example, fine convex protrusions arranged at regular intervals (that is, the surface 31 is subjected to surface roughening treatment), and hence the palm-rest surface 31 has a roughened surface. More specifically, the touchpad surface 34 according to this embodiment is provided with minute unevenness having a soft texture as compared with the palm-rest surface 31, although the surface of the touchpad surface 34 is not a flat surface like a mirror surfacer for example.

As shown in FIG. 2, the palm-rest surface 31 formed rough as described above surrounds the outer peripheral edge 34a of the touchpad surface 34. Further, in this embodiment, the palm-rest surface 31 formed rough extends up to the outer peripheral edge 34a of the touchpad surface 34, and is adjacent to the touchpad surface 34.

Incidentally, in this embodiment, the palm-rest surface 31 and the touchpad surface 34 are formed on the same plane. Further, both the palm-rest surface 31 and the touchpad surface 34 are formed integral with each other as a part of the top wall 5.

Next, functional components provided on the sidewalls 6c and 6d of the housing 4 will be described below.

Figure 5:
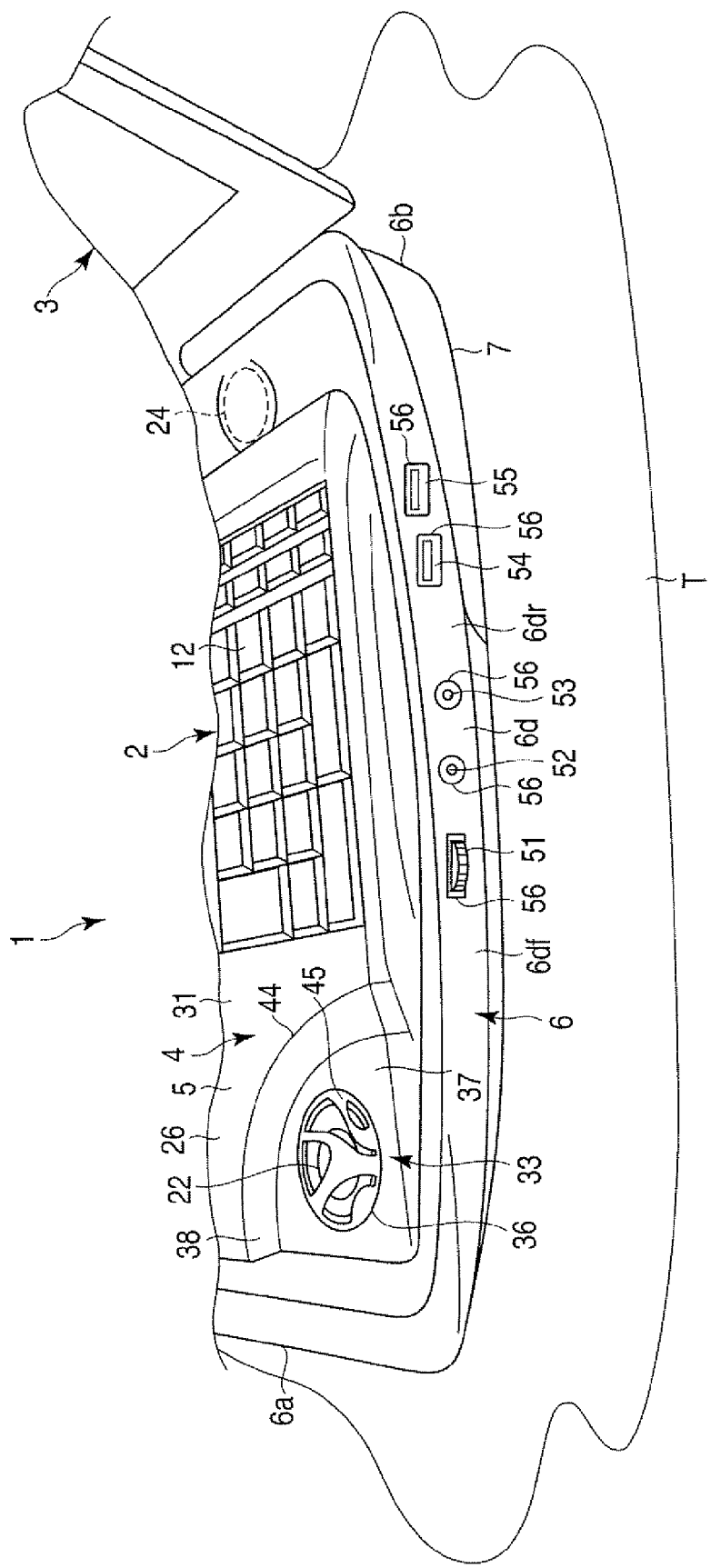
FIG. 5 is an exemplary perspective view showing a right sidewall of the portable computer shown in FIG. 1.
Figure 6:
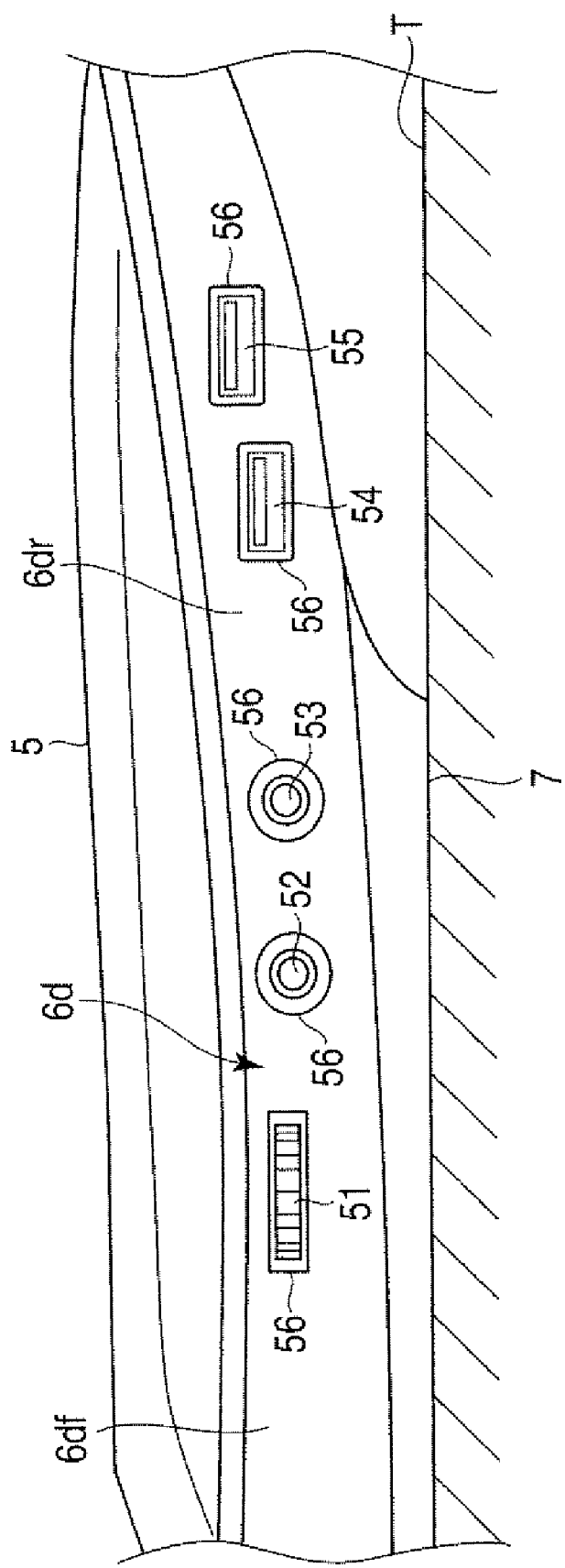
FIG. 6 is an exemplary perspective view showing the right sidewall of the portable computer shown in FIG. 5.

As shown in FIGS. 5 and 6, on the right sidewall 6d of the housing 4, a volume controller 51, a headphone connector 52, a microphone connector 53, a first Universal Serial Bus (USB) connector 54, and a second USB connector 55 are provided in the order mentioned from the front side. The volume controller 51, and the connectors 52, 53, 54, and 55 are examples of the functional component mentioned in the present invention. As shown in FIG. 5, the sidewall 6d is formed into a curved shape in which the height of the sidewall 6d becomes gradually higher from the front side to the rear side.

As shown in FIG. 6, when the portable computer 1 is placed on a desktop T, the volume controller 51, headphone connector 52, and microphone connector 53 are at substantially the same height from the desktop T.

On the other hand, the first USB connector 54 is mounted at such a position that the height of the connector 54 from the desktop T is larger than that of the microphone connector 53 when the portable computer 1 is placed on the desktop T. Further, the second USB connector 55 is mounted at such a position that the height of the connector 55 from the desktop T is larger than that of the first USB connector 54 when the portable computer 1 is placed on the desktop T. That is, the microphone connector 53, and the first and second USB connectors 54 and 55 are arranged stepwise (i.e., obliquely) in such a manner that the more posterior the arrangement position of the corresponding component is, the larger the height of the corresponding component from the desktop T becomes.

That is, the microphone connector 53 is an example of the first functional component mentioned in the present invention, and the first USB connector 54 is an example of the second functional component configured to be farther from the user than the first functional component (microphone connector 53). Further, the first USB connector 54 is an example of the first functional component mentioned in the present invention, and the second USE connector 55 is an example of the second functional component configured to be farther from the user than the first functional component (first USB connector 54).

As shown in FIG. 2, the volume controller 51 is arranged in the anterior half part 6df (i.e., a region closer to the user than the center of the sidewall 6d) of the sidewall 6d. Each of the headphone connector 52, microphone connector 53, and first and second USB connectors 54 and 55 is a port connector into which a terminal section of a cable can be inserted. These connectors 52, 53, 54, and 55 are arranged in the posterior half part 6dr (i.e., a region farther from the user than the center of the sidewall 6d) of the sidewall 6d.

Figure 7:
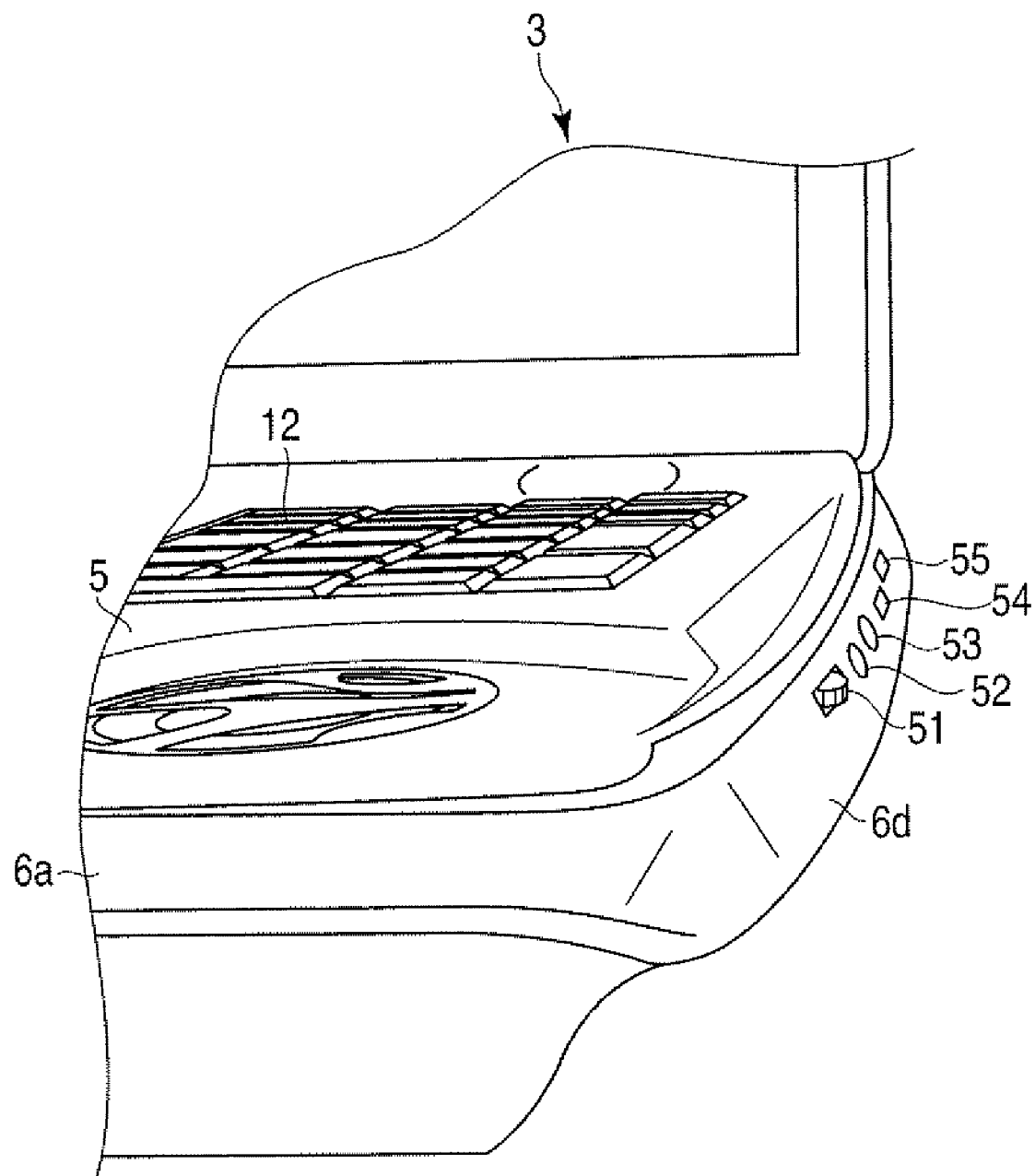
FIG. 7 is an exemplary perspective view of the right sidewall of the portable computer shown in FIG. 5 viewed from the front.

Further, as shown in FIG. 7, the sidewall 6d is formed in which the amount of outward protrusion of the sidewall 6d toward the outside of the housing 4 increases as the position on the sidewall 6d becomes lower. The volume controller 51, and the connectors 52, 53, 54, and 55 are each mounted inside the housing 4, and are exposed to the outside of the housing 4 through opening parts 56 opened in the sidewall 6d.

Figure 8:
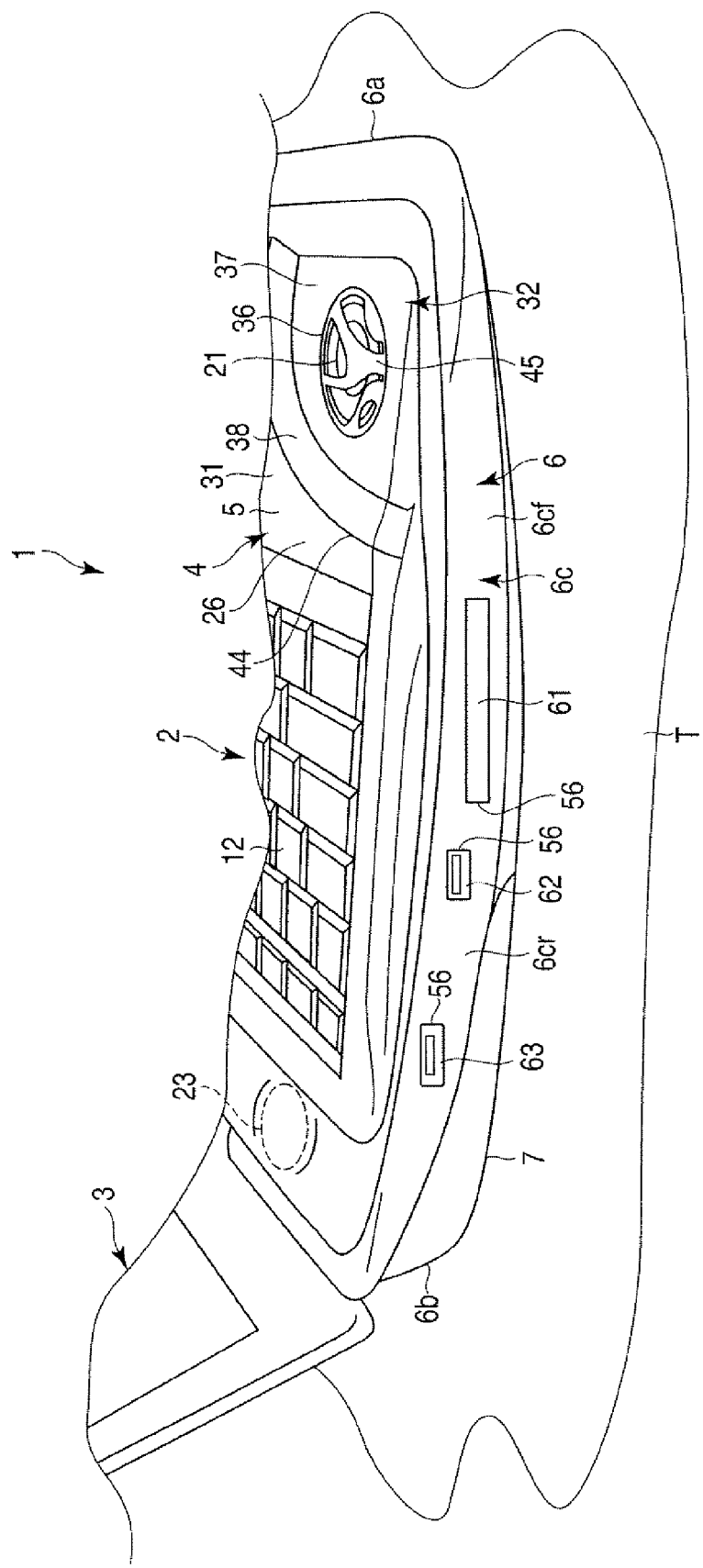
FIG. 8 is an exemplary perspective view showing a left sidewall of the portable computer shown in FIG. 1.

As shown in FIG. 8, on the left sidewall 6c of the housing 4, a card slot 61, a USB connector 62, and a combination connector 63 of USB and External Serial ATA (eSATA) are provide in the order mentioned from the front side. The card slot 61, and the connectors 62 and 63 are examples of the functional component mentioned in the present invention. As shown in FIG. 8, the sidewall 6c is formed into a curved shape in which the height of the sidewall 6c becomes gradually higher from the front side to the rear side.

As shown in FIG. C, the USB connector 62 is mounted at such a position that the height of the connector 62 from the desktop T is larger than that of the card slot 61 when the portable computer 1 is placed on the desktop T. Further, the combination connector 63 is mounted at such a position that the height of the connector 63 from the desktop T is larger than that of the USB connector 62 when the portable computer 1 is placed on the desktop T. That is, the card slot 61, the USB connector 62, and the combination connector 63 are arranged stepwise in such a manner that the more posterior the arrangement position of the corresponding component is, the larger the height of the corresponding component from the desktop T becomes.

That is, the card slot 61 is an example of the first functional component mentioned in the present invention, and the USB connector 62 is an example of the second functional component configured to be farther from the user than the first functional component (card slot 61). Further, the USB connector 62 is an example of the first functional component mentioned in the present invention, and the combination connector 63 is an example of the second functional component configured to be farther from the user than the first functional component (USB connector 62).

As shown in FIG. 8, the card slot 61 is arranged in the anterior half part 6cf of the sidewall 6c. Each of the USB connector 62 and combination connector 63 is a port connector into which a terminal section of a cable can be inserted. These connectors 62 and 63 are arranged in the posterior half part 6cr of the sidewall 6c. Further, like the right sidewall 6d, the sidewall 6c is formed in which the amount of outward protrusion of the sidewall 6c toward the outside of the housing 4 increases as the position on the sidewall 6c becomes lower. The card slot 61, and the connectors 62 and 63 are each mounted on the inside of the housing 4, and are exposed to the outside of the housing 4 through opening parts 56 opened in the sidewall 6c.

Next, the foot sections 71, 72, 73, and 74 provided on the bottom wall 7 of the housing 4 will be described below.

Figure 9:
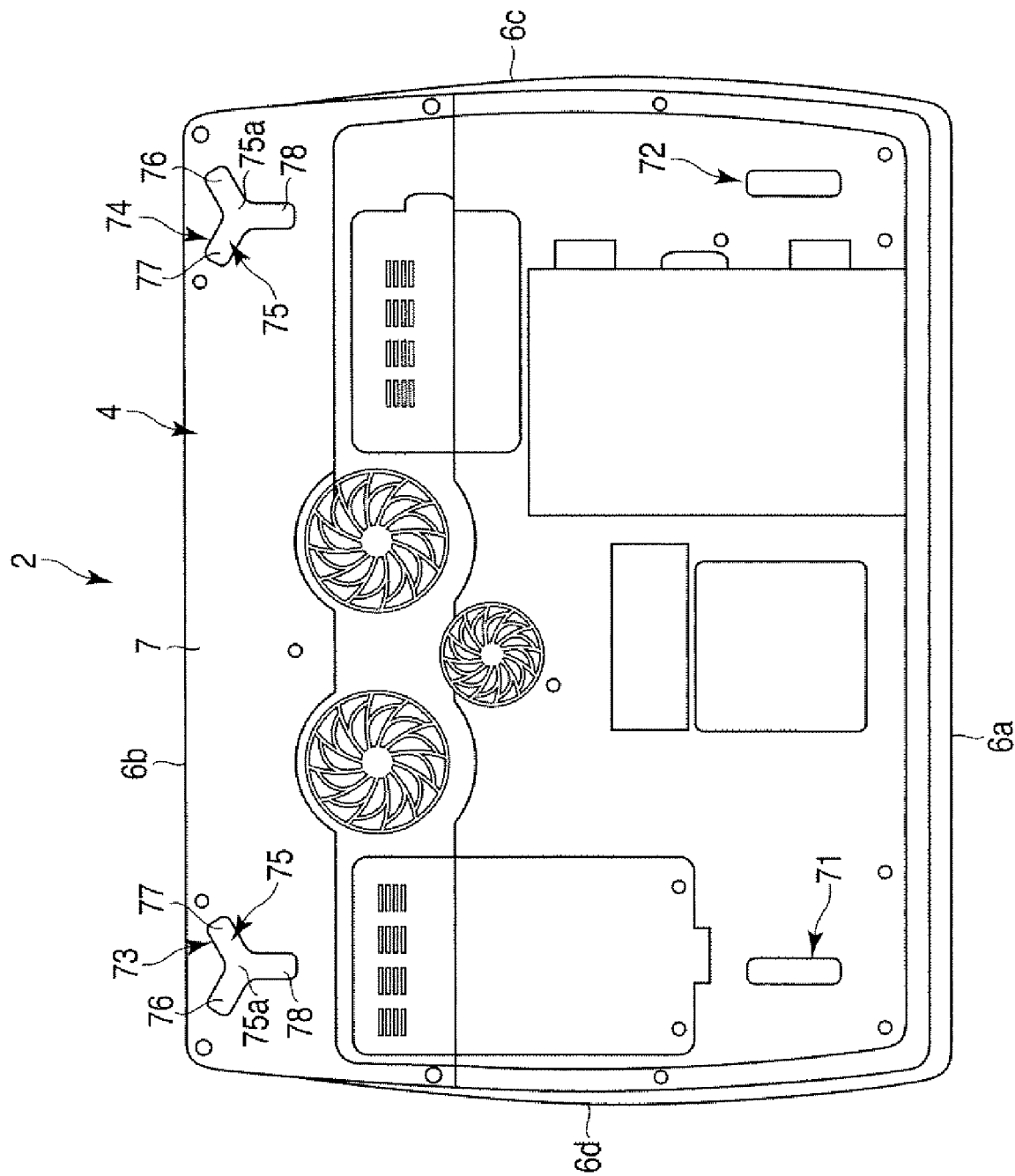
FIG. 9 is an exemplary bottom view showing a bottom wall of the portable computer shown in FIG. 1.

As shown in FIG. 9, for example, four foot sections 71, 72, 73, and 74 made of rubber are provided on the bottom wall 7. These foot sections 71, 72, 73, and 74 comprise first foot sections 71 and 72 provided on the front end section of the bottom wall 7, and the second foot sections 73 and 74 provided on the rear end section of the bottom wall 7.

The first foot section 71, 72 is formed into an I-shape extending in the depth direction of the housing 4. On the other hand, the second foot section 73, 74 is formed into a Y-shape. More specifically, the second foot section 73, 74 comprises a bent section 75. The bent section 75 is formed into a V-shape having an apex 75a to be directed (i.e., convex toward the user side) to the user (i.e., the front side). That is, the bent section 75 is constituted of two straight-line sections 76 and 77 intersecting each other at an angle smaller than 180°. The angle formed between the two straight-line sections 76 and 77 is, for example, 120°.

The second foot section 73, 74 further comprises a straight-line section 78 configured to extend from the apex 75a (i.e., an intersection of the two straight-line sections 76 and 77) of the bent section 75 toward the user, and is formed into the Y-shape as a whole. Each of the angles formed between the straight-line section 78 and the straight-line sections 76 and 77 of the bent section 75 is, for example, 120°.

According to the portable computer 1 configured as described above, it is possible to improve the designability, and improve the operability. An effect of each configuration according to this embodiment will be described below.

(Speaker Exposure Surface)

In the case where the opening part exposing the speaker and the palm-rest surface are formed on the same plane, for example, when the user's hand is placed on the palm-rest surface at the time of using the keyboard, the opening part is liable to be closed by the user's hand, and there is the possibility of the sound from the speaker being intercepted by the user's hand.

On the other hand, in the portable computer 1 according to this embodiment, the speaker exposure surface 32, 33 in which the opening part 36 for exposing the speaker 21, 22 is provided is depressed and lower than the palm-rest surface 31. According to such a configuration, even when the user's hand H is placed on the palm-rest surface 31 at the time of using the keyboard 12 or the like, a space is easily secured between the user's hand and the speaker exposure surface 32, 33, and the opening part 36 of the speaker exposure surface 32, 33 is hardly closed by the user's hand.

As a result of this, the sound output from the speaker 21, 22 is hardly intercepted by the user's hand, and good sound can be delivered to the user. In other words, the user can use the keyboard 12 without minding fear of closing the opening part 36 by his or her hand. As a result of this, the operability of the portable computer 1 is improved.

The portable computer 1 is provided with speaker cover 45 attached to the opening part 36 of the speaker exposure surface 32, 33, and the speaker cover 45 comprises a top surface section 46 upwardly swelling higher than the speaker exposure surface 32, 33, and at least one of the sound ports 47 provided in the top surface section 46. According to such a configuration, even when the user's hand H is positioned above the speaker cover 45, the sound ports 47 are hardly closed by the user's hand H. As a result of this, the sound from the speaker 21 and 22 becomes further hardly intercepted by the user's hand.

In the case where the border section 44 between the speaker exposure surface 32, 33 and the palm-rest surface 31 is formed into an arcuate shape made convex from the speaker exposure surface 32, 33 toward the palm-rest surface 31, the rounded part of the border section 44 easily fits with the user's hand. As a result of this, the user can place his or her hand on the palm-rest surface 31 adjacent to the speaker exposure surface 32, 33 almost without feeling any discomfort, thereby improving the operability.

(Palm-Rest Surface)

In the case where the texture of the palm-rest surface 31 and that of the touchpad surface 34 resemble each other, it is difficult to distinguish between the palm-rest surface 31 and the touchpad surface 34 by, for example, a touch of the fingertip. That is, it becomes necessary to visually recognize where the touchpad surface 34 is, and it cannot be said that the operability is sufficiently high in, for example, the dark.

On the other hand, in the portable computer 1 according to this embodiment, the palm-rest surface 31 is rougher in texture than the touchpad surface 34, and the palm-rest surface 31 surrounds the outer peripheral edge of the touchpad surface 34. According to such a configuration, it becomes easy to distinguish between the palm-rest surface 31 and the touchpad surface 34. That is, it becomes possible to easily recognize where the touchpad surface 34 is by a touch or the like of the fingertip or the like. This contributes to improvement in the operability of the portable computer 1. Further, in the case where the touchpad surface 34 is formed to have a rough surface finish, fingerprints are hardly left, and the maintainability is also improved.

In the case where the palm-rest surface 31 and the touchpad surface 34 are formed on the same plane, the effect described above is produced more easily. Furthermore, it is possible to provide a portable computer 1 of an innovative design in which the touchpad surface 34 and the palm-rest surface 31 coincide with each other.

(Functional Component)

In the case where a plurality of functional components (for example, connectors) are arranged at the same height each other, a functional component on the anterior side is an obstacle, and a functional component on the posterior side (that is, the rear side) is difficult to use in some cases.

On the other hand, the portable computer 1 according to this embodiment comprises the first functional component and the second functional component configured to be farther from the user than the first functional component, and the second functional component is mounted at such a position that the height of the second functional component from the desktop is larger than that of the first functional component when the portable computer 1 is placed on the desktop T. According to such a configuration, the functional component on the anterior side hardly becomes an obstacle when the functional component on the posterior side is used, and ease of use (for example, ease of attachment/detachment of a cable) of the posterior functional component is improved. That is, the operability of the portable computer 1 is improved.

In the case where the sidewall 6c, 6d is formed in which the amount of outward protrusion of the sidewall 6c, 6d toward the outside of the housing 4 increases as the position on the sidewall 6c, 6d becomes lower, the visibility (i.e., ease of seeing) of the connector on the posterior side viewed from the user is improved, and ease of use of the functional component on the posterior side is further improved.

Each of the first and second functional components is a port connector, and when both the first and second functional components are configured to be farther from the user than the center of the sidewall 6c, 6d when viewed from the user, cables connected to the first and second functional components which are port connectors hardly become obstacles when the portable computer 1 is used, and the operability of the portable computer is further improved.

(Foot Section)

In a portable computer provided with foot sections each extending in the backward and forward direction, when a backward load is applied to this portable computer, the portable computer is liable to be moved backward, and cannot be used stably in some cases.

On the other hand, in the portable computer 1 according to this embodiment, foot section 73, 74 made of rubber comprises a bent section 75 formed into a V-shape having an apex 75a to be directed to the user. In the case where the foot section 73, 74 comprises such a bent section 75, if a backward load is applied to the portable computer 1, holding at the foot section 73, 74 is easily made effective, whereby the portable computer is hardly moved backward. As a result of this, the portable computer 1 can be operated stably, and the operability of the portable computer 1 is improved.

On the other hand, when the ODD or a CD-ROM is used, the portable computer 1 is drawn forward in some cases. The bent section 75 is not so effective for the forward movement (i.e., movement toward the user) because the resistance is not so strong. Thus, by providing the foot section 73, 74 with the bent section 75, it is possible to obtain a portable computer 1 which is hardly moved backward, and is easily moved forward.

In the case where the foot section 73, 74 is formed into a Y-shape comprising a straight-line section 78 configured to extend from the apex 75a of the bent section 75 toward the user, the foot section 73, 74 becomes further stable, and the operability of the portable computer 1 is further improved.

The portable computer 1 according to one embodiment of the present invention has been described above. However, the present invention is not limited to this. The constituent elements of the present invention can be modified and embodied in the implementation stage within the scope not deviating from the gist of the invention.

For example, the border section 44 between the speaker exposure surface 32, 33 and the palm-rest surface 31 need not be formed into an arcuate shape. The top surface section 46 of the speaker cover 45 need not be formed into a dome-like shape. The touchpad surface 34 and the palm-rest surface 31 are not necessarily positioned on the same plane. The foot section 73, 74 is not limited to the Y-shape, and may be formed into a V-shape.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a housing comprising a top wall and a peripheral wall extending downward from an edge portion of the top wall;
    a keyboard supported on the top wall; and
    a speaker contained in the housing, wherein
    the top wall comprises a region positioned on the front side of the keyboard, the region comprising a palm-rest surface on which a user's hand is to be placed when the keyboard is in use, and a speaker exposure surface comprising an opening part exposing the speaker to an outside of the housing,
    the speaker exposure surface is provided at an end portion of the top wall, a whole of the speaker exposure surface being depressed and lower than the palm-rest surface, the end portion of the top wall including the speaker exposure surface being connected to the peripheral wall while being lower than the palm-rest surface, and
    a speaker cover is attached to the opening part of the speaker exposure surface, the speaker cover comprising a top surface section which has a shape of a dome throughout the speaker cover and upwardly swells higher than the speaker exposure surface, a sound port being provided in the top surface section and including a part of an opening near a peripheral edge portion of the speaker cover.

2. The electronic apparatus of claim 1, wherein the top surface section of the speaker cover is lower than the palm-rest surface.

* * * * *